US005402633A

United States Patent [19]

Hu

[11] Patent Number: 5,402,633

[45] Date of Patent: Apr. 4, 1995

[54] PREMIX GAS NOZZLE

[75] Inventor: Aaron S. Hu, Hartford, Conn.

[73] Assignee: United Technologies Corporation, Hartford, Conn.

[21] Appl. No.: 132,266

[22] Filed: Oct. 6, 1993

Related U.S. Application Data

[62] Division of Ser. No. 841,942, Feb. 26, 1992, Pat. No. 5,307,634.

[51] Int. Cl.[6] .................. F02C 7/26

[52] U.S. Cl. .................. 60/39.06; 60/737

[58] Field of Search .................. 60/39.06, 737, 738, 60/742, 743, 748, 746

[56] References Cited

U.S. PATENT DOCUMENTS 4,292,801 10/1981 Wilkes et al. .................. 60/39.06
4,603,548 8/1986 Ishibashi et al. .................. 60/39.06
4,653,278 3/1987 Vinson et al. .................. 60/737
4,781,030 11/1988 Hellat et al. .................. 60/743
5,069,029 12/1991 Kuroda et al. .................. 60/39.06
5,081,844 1/1992 Keller et al. .................. 60/737

FOREIGN PATENT DOCUMENTS 2073399 10/1981 United Kingdom .

*Primary Examiner*—Richard A. Bertsch
*Assistant Examiner*—M. Kocharov
*Attorney, Agent, or Firm*—Edward L. Kochey, Jr.

[57] ABSTRACT

A premix gas nozzle has longitudinal tangential entrance slots to a cylindrical chamber. There is an axially increasing flow area toward the chamber outlet, with pilot fuel centrally introduced near the outlet. A lean mix low NOx fuel nozzle is thereby stabilized.

2 Claims, 3 Drawing Sheets

PREMIX GAS NOZZLE

This is a division of application Ser. No. 07/841,942, filed on Feb. 26, 1992, now U.S. Pat. No. 5,307,634.

TECHNICAL FIELD

The invention relates to fuel nozzles for low NOx combustion and in particular to the stabilization thereof.

Background of the Invention

Combustion at high temperature leads to the formation of NOx, or oxides of nitrogen, because of the combination of oxygen with nitrogen at high temperature. This is a notorious pollutant and much effort is being put forth to reduce the formation of NOx.

One solution has been to premix the fuel with excess air whereby all of the combustion occurs with a local high excess air and therefore at a relatively low temperature. Such combustion, however, can lead to instability and incomplete combustion.

This problem is exacerbated in gas turbine engines. Once the proper lean mix is set for proper full load operation, low load operation must be considered. At decreasing loads the airflow decreases less than the fuel flow, leading to even leaner mixtures. The air temperature also decreases. Accordingly, flame stability and combustion efficiency (percentage of fuel burnt) becomes an increasing problem.

SUMMARY OF THE INVENTION

Gas and air are mixed at a tangential entrance through longitudinal slots in a cylindrical chamber. A center cone provides an increasing axial flow area toward the chamber outlet.

The gas swirl within the chamber completes the air and gas mixing. Additional gas is supplied as pilot fuel on the central axis of the chamber near the outlet.

This pilot fuel remains in the core. As it leaves the chamber it is met with high temperature recirculating products from the flame. These products are primarily hot air because of the high localized air/fuel ratio. Local self ignition maintains the flame stability. It has also been found to increase the combustion efficiency.

As load is decreased pilot fuel is maintained constant, or at least reduced less than the main fuel. This increase in local combustion is acceptable without increasing NOx since the air temperature itself is decreasing at these low loads.

DESCRIPTION OF THE PREFERRED EMBODIMENT

Figure 1:
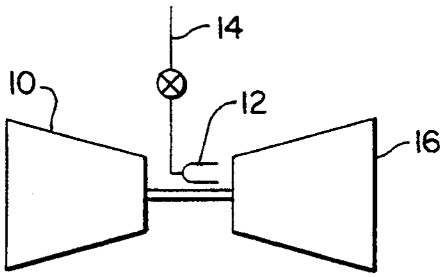
FIG. 1 is a schematic of a gas turbine engine and combustor.

The FIG. 1 schematic illustrates a gas turbine engine with compressor 10 supplying compressed air to combustor 12. Gas which is fueled through gas supply line 14 provides fuel for combustion within the combustor with the gaseous products passing through turbine 16.

Figure 2:
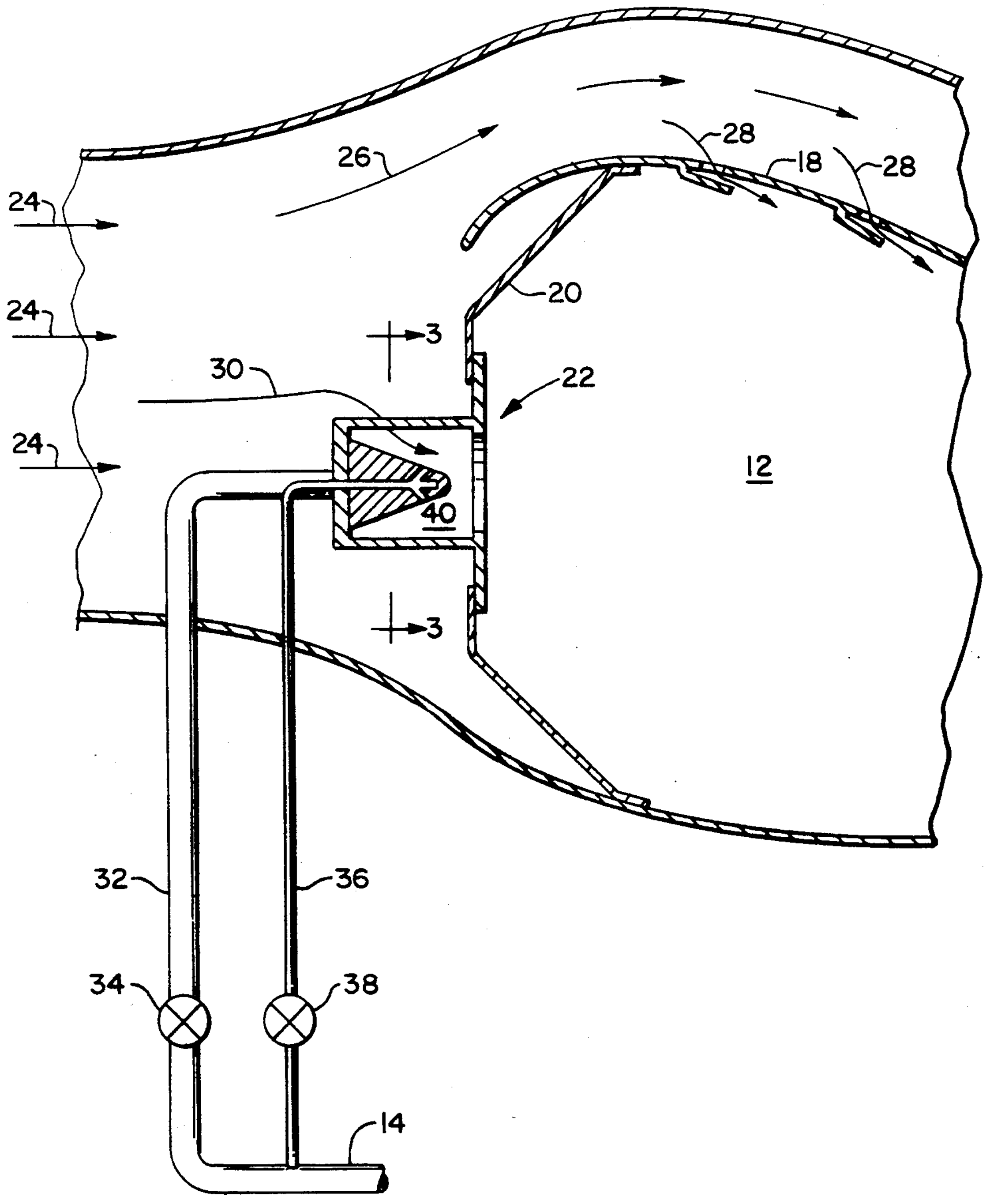
FIG. 2 is a sectional side view of the burner.

Referring to FIG. 2, combustor 12 is surrounded by combustor liner 18 and has in the upstream face 20 a plurality of circumferentially spaced burners 22. The structure is sized such that of the incoming airflow 24 from the compressor 35 percent of this flow passes as dilution air 26 around a burner with the majority of this passing as cooling air 28 through the combustion liner. 65 percent of this airflow passes as combustion supporting air 30 through the burner.

From the fuel header 14 the main gas flow is supplied through line 32 and controlled by valve 34. A pilot flow of gas passes through pilot line 36 being controllable by valve 38.

Figure 3:
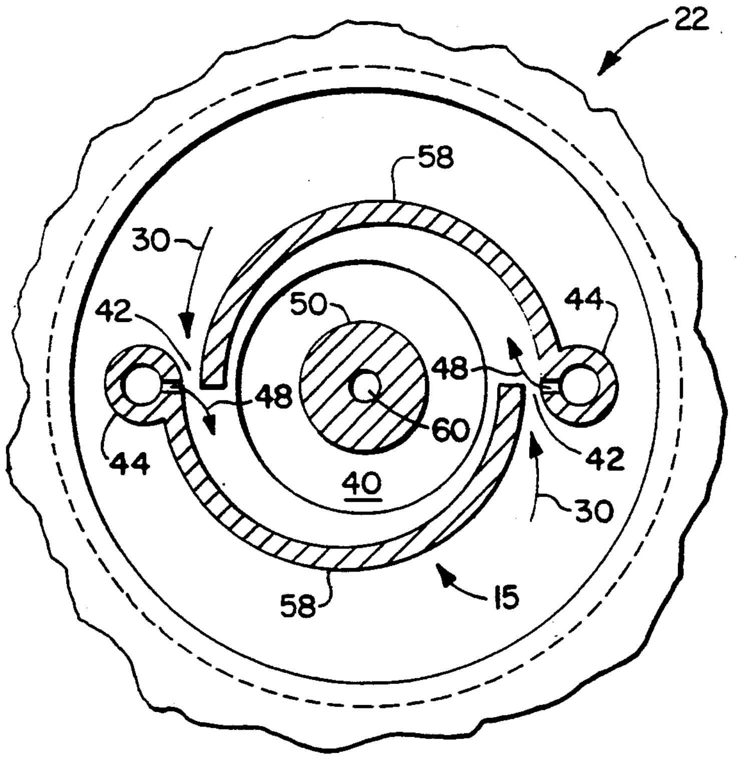
FIG. 3 is a sectional axial view of the burner.
Figure 4:
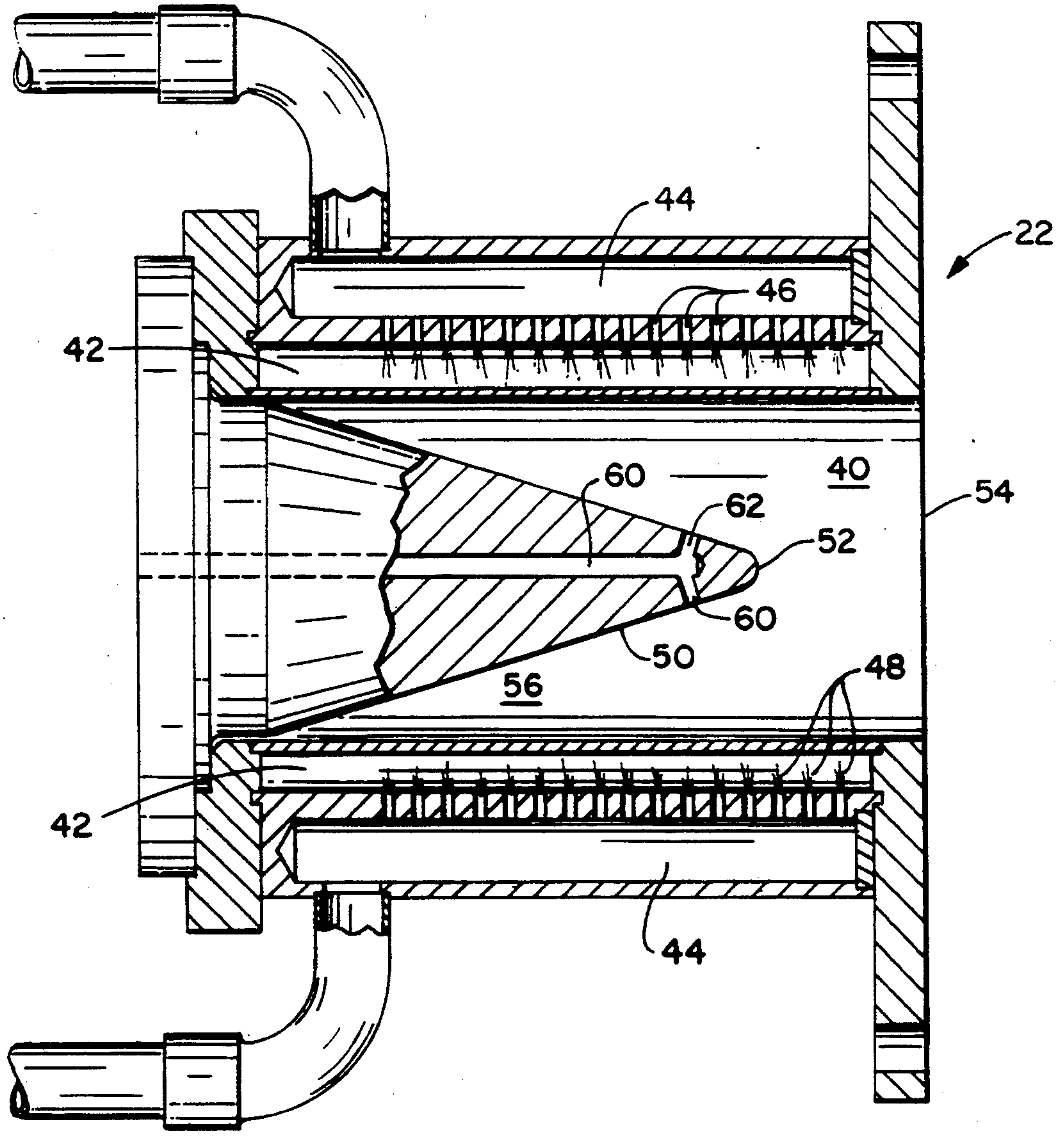
FIG. 4 is a sectional axial view taken at 90° from FIG. 3.

Referring to FIGS. 3 and 4, burner 22 is comprised of a substantially cylindrical axially extending chamber 40. Two longitudinally extending slots 42 are located with the walls tangent to the inner wall of the cylindrical chamber. Combustion supporting airflow 30 passes through these slots establishing a whirling action in chamber 40. The main gas flow line 32 is divided to supply two gas distribution manifolds 44 located adjacent the air inlet slot 42. A plurality of holes 46 are located along the length of manifold 44. These distributively inject gas as a plurality of streams 48 into the airflow passing into the slot. The gas and air continue mixing as the mixture swirls through chamber 40.

Centrally located within the chamber 40 is a cone 50 with its base toward the upstream end of the chamber and its apex 52 toward the outlet 54 end of the chamber. Resulting flow area 56 therefore increases toward the outlet of the chamber so that the mixture of air and gas passing axially along the chamber maintains a somewhat constant velocity. This deters flashback from the flame into the upstream end of the chamber.

The substantially cylindrically chamber 15 is formed by two semi-cylindrical walls 58 each having its axis offset from one another to form the slots 42.

A gas pilot tube 60 passes through the center of the cone with pilot discharge openings 62 at or adjacent the apex 52 of the cone. This location should be within 25 percent of the length of the chamber 14 from the outlet 54 of the chamber. The objective is to introduce the additional gas flow centrally of the swirling air/gas mixture, but not to mix it in with the air/gas mixture. This is aided by the fact that the incoming gas is lighter than the air or air/gas mixture.

In full load operation of the gas turbine engine, between 4 and 6 percent of the total gas flow may be supplied through the pilot openings 62 without increasing the NOx. In most cases the pilot is not needed for stability at the high load. The flow, however, cools the nozzle, and avoids operational complexity of turning the pilot on when load is reduced. Pilot operation is therefore preferred, though not required at full load.

As load is reduced on the gas turbine engine, the overall airflow drops less rapidly than the gas flow. Since the relationship of the airflow between the combustion air and the dilution air is set by the physical design of the structure, it remains constant. The mixture in the combustion zone therefore becomes increasingly lean. The preferred operation is to decrease load by closing down on valve 34 while leaving valve 38 open. This increases the proportion of fuel introduced through the pilot. At this same time, however, the air temperature from the compressor decreases. The additional temperature because of the higher concentration of pilot fuel is acceptable without increasing NOx because of this overall temperature decrease.

It is understood that during test operation it may be found that some other manipulation of valve 38 is preferred rather than to maintain it in a fixed position. It nonetheless should produce an increasing percentage of the fuel through the pilot during load decrease.

Figure 5:
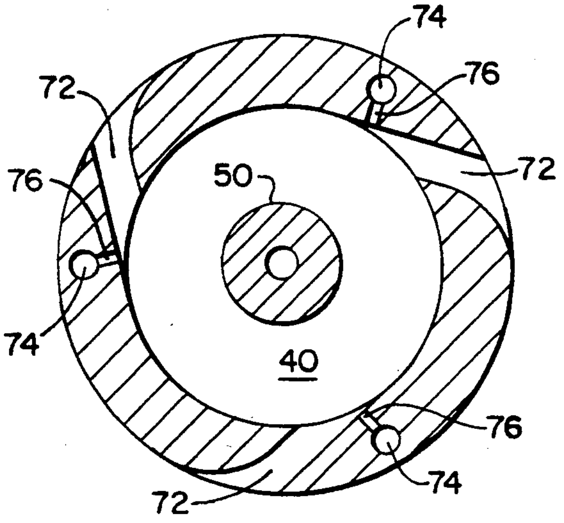
FIG. 5 is a sectional axial view of an alternate burner embodiment.

FIG. 5 illustrates a section through an alternate nozzle embodiment showing chamber 14 and cone 50. Three inlet slots 72 are provided for the air inlet while the main gas flow passes through gas manifolds 74 and ejecting through holes 76 into slot 72.

Flame stability is achieved without NOx increase at reduced loads.

I claim:

1. A method of burning gas in the combustor of a gas turbine engine with a premixing type of combustion, comprising:

introducing combustion air into a substantially cylindrical chamber having a wall with longitudinally extending slots therein, and an increased axial flow area toward an outlet end of said substantially cylindrical chamber through said slots tangentially to said wall;

distributively injecting a main gas flow into said combustion air to said substantially cylindrical chamber along said slots;

burning said main gas flow at the outlet of said substantially cylindrical chamber; and introducing a pilot gas flow into said gas chamber at a location within 25 percent of the axial length of said chamber from the outlet of said chamber.

2. The method of claim 1 comprising also:

at maximum output of said gas turbine engine introducing as pilot gas flow between 4 and 6 percent of the total of said pilot gas flow and said main gas flow; and increasing the percentage of said pilot gas flow as a percentage of the total flow at outputs below said maximum amount.

* * * * *